United States Patent
Haeg et al.

(10) Patent No.: US 6,640,638 B1
(45) Date of Patent: Nov. 4, 2003

(54) LOADING ASSEMBLY FOR A VEHICLE SPINDLE TEST FIXTURE

(75) Inventors: Steven R. Haeg, Shorewood, MN (US); Ricky L. Zieman, Chaska, MN (US); Glen C. Grenier, Ray, MI (US); Chad E. Brose, Eagan, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

(21) Appl. No.: 09/389,563

(22) Filed: Sep. 3, 1999

(51) Int. Cl.[7] ............................................. G01M 17/04
(52) U.S. Cl. ....................................... 73/669; 73/118.1
(58) Field of Search .............................. 73/669, 118.1, 73/865.3, 865.6, 865.9

(56) References Cited

U.S. PATENT DOCUMENTS

| | | | |
|---|---|---|---|
| 3,028,761 A | 4/1962 | Cole, Jr. ........................ 74/69 |
| 3,713,330 A | 1/1973 | Lentz ............................ 73/93 |
| 3,821,893 A | 7/1974 | Klinger et al. ................ 73/118 |
| 3,827,289 A | 8/1974 | Borg .......................... 73/71.7 |
| 4,016,754 A | 4/1977 | Wiss .......................... 73/117.3 |
| 4,133,201 A | 1/1979 | Klinger ........................ 73/12 |
| 4,263,809 A | * 4/1981 | Petersen et al. .............. 73/669 |
| 4,501,139 A | 2/1985 | Petersen ....................... 73/118 |
| 4,567,782 A | 2/1986 | Speicher et al. ............... 74/96 |
| 4,658,656 A | * 4/1987 | Haeg ............................ 73/669 |
| 4,733,558 A | * 3/1988 | Grenier ......................... 73/669 |
| 4,977,791 A | 12/1990 | Erichsen ....................... 74/470 |
| 4,981,034 A | * 1/1991 | Haeg ............................ 73/669 |
| 5,083,453 A | * 1/1992 | Daley ......................... 73/118.1 |
| 5,088,320 A | 2/1992 | Fukuda et al. ............. 73/118.1 |
| 5,131,267 A | 7/1992 | Fukuda et al. ............. 73/118.1 |
| 5,241,856 A | 9/1993 | Petersen et al. ........... 73/118.1 |
| 5,465,615 A | * 11/1995 | Petersen et al. .............. 73/669 |
| 5,533,403 A | * 7/1996 | Haeg et al. ................... 73/669 |
| 5,633,464 A | * 5/1997 | Haeg et al. ................... 73/669 |

* cited by examiner

*Primary Examiner*—Eric S. McCall
(74) *Attorney, Agent, or Firm*—Westman, Champlin & Kelly, P.A.; S. Koehler

(57) ABSTRACT

A loading assembly used in a vehicle spindle test fixture includes a wheel adapter housing that is mountable to a vehicle spindle. A pair of vertical struts are provided. Each vertical strut is joined to the wheel adapter housing at spaced-apart first pivot connections. A bell crank is coupled to each end of the vertical struts at spaced-apart second pivot connections. An actuator is pivotally coupled to the bell crank at a third pivot connection. The location of the second pivot connections relative to the third pivot connection approximates the location of the first pivot connections relative to the spindle axis.

19 Claims, 4 Drawing Sheets

LOADING ASSEMBLY FOR A VEHICLE SPINDLE TEST FIXTURE

BACKGROUND OF THE INVENTION

The present invention relates to loading assemblies used for testing vehicles. More particularly, the present invention relates to a loading assembly for applying at least one of a longitudinal force, a lateral force, a vertical force, a braking moment, a steer moment and a camber moment to a vehicle spindle.

Many test fixtures have been advanced to apply forces and moments to a vehicle spindle in order to simulate driving or road conditions. These test fixtures often include separate actuators to apply vertical, longitudinal and lateral forces as well as braking moments to the vehicle spindle. U.S. Pat. Nos. 4,733,558; 5,083,453 and 5,465,615 disclose three such test fixtures.

Commonly, the test fixtures include a wheel adapter housing that is mounted to the vehicle spindle. Two vertical struts are joined to the perimeter of the wheel adapter housing and are used to, transfer the longitudinal forces, the vertical forces and the braking moments to the vehicle spindle. A center downwardly projecting tang located between the vertical struts and also joined to the perimeter of the wheel adapter housing is joined to a lateral strut, which is used to transmit lateral force developed from an actuator. Otherwise, a plurality of struts can be used to induce a lateral force or steer and camber moments.

Although the above-identified test fixtures are often quite capable of applying longitudinal forces, vertical forces, lateral forces, braking moments, steer moments and/or camber moments to the vehicle spindle, vehicle fender well sheet metal can create clearance problems that make application of the fixtures to some vehicles difficult.

There is also an on-going need to reduce or minimize "crosstalk". Crosstalk exists when unwanted or undesired loads are induced in the vehicle spindle due to the displacement of the vehicle spindle or application of selected forces or moments to the vehicle spindle. For example, in some prior art designs, a longitudinal force can be induced in the vehicle spindle due to steer displacement of the vehicle spindle. Crosstalk commonly is associated with the design of the loading assembly, and in particular, the arrangement and coupling the loading-assembly components.

An improved loading assembly that addresses one, some or all of these concerns is therefore desired.

SUMMARY OF THE INVENTION

A loading assembly used in a vehicle spindle test fixture includes a wheel adapter housing that is mountable to a vehicle spindle. A pair of vertical struts are provided. Each vertical strut is joined to the wheel adapter housing at spaced-apart first pivot connections. A bell crank is coupled to each end of the vertical struts at spaced-apart second pivot connections. An actuator is pivotally coupled to the bell crank at a third pivot connection. The location of the second pivot connections relative to the third pivot connection approximates the location of the first pivot connections relative to the spindle axis.

A second broad aspect of the present invention is a loading assembly having a wheel adapter housing that is mountable to the vehicle spindle, a first bell crank, and a connecting strut pivotally connected to the wheel adapter housing and the first bell crank. A first actuator is operably connected to the first bell crank to displace the wheel adapter housing substantially along the spindle axis. A pair of second bell cranks are pivotally connected to the first bell crank. A pair of second connecting struts are provided. Each second connecting strut is pivotally connected to one of the second bell cranks and operably connected to the wheel adapter housing to selectively displace the wheel adapter housing. At least one second actuator is operably connected to the second bell cranks.

DETAILED DESCRIPTION OF THE ILLUSTRATIVE EMBODIMENTS

Figure 1:
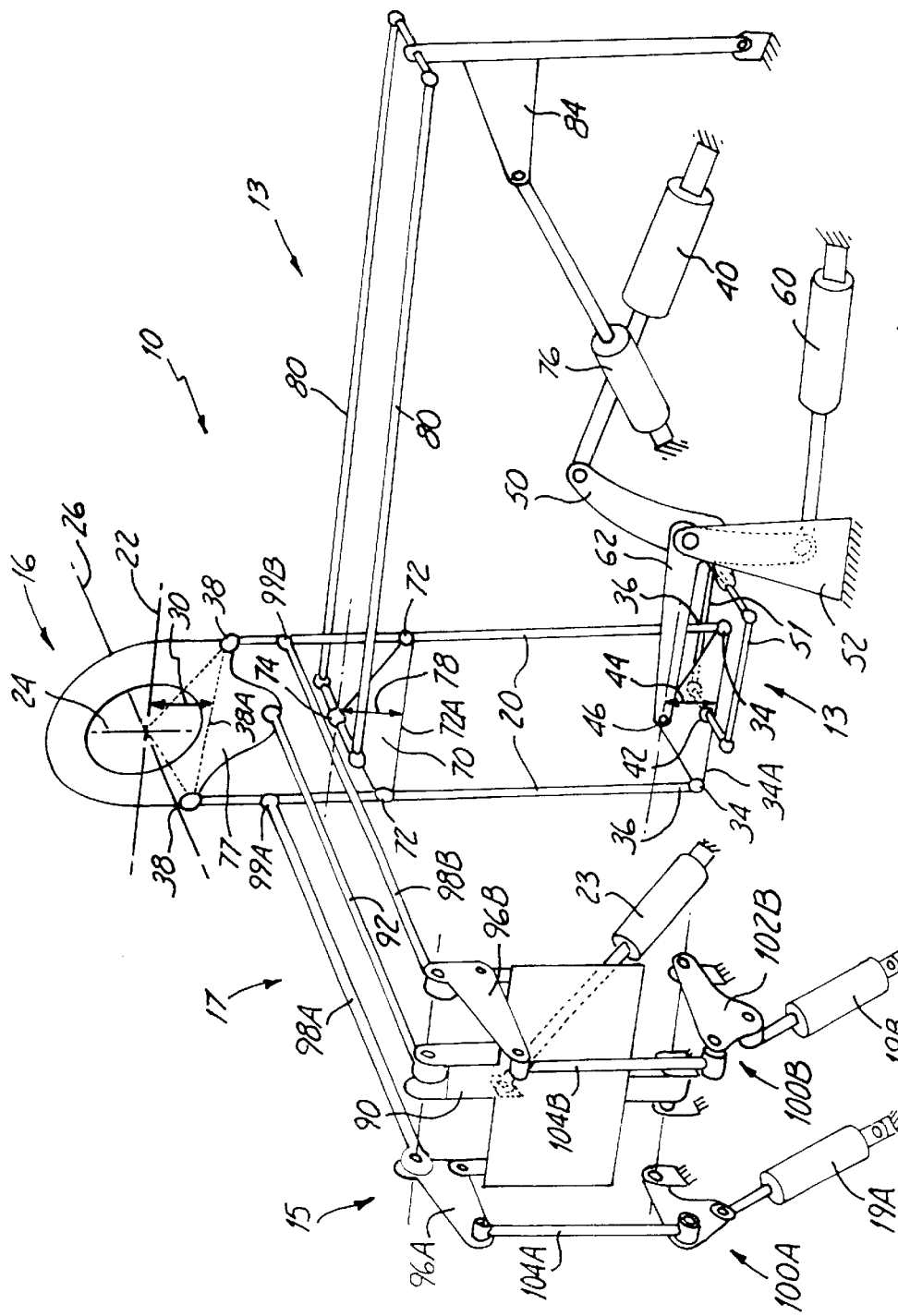
FIG. 1 is a schematic representation of a vehicle spindle test fixture including each loading assembly of the present invention.
Figure 2:
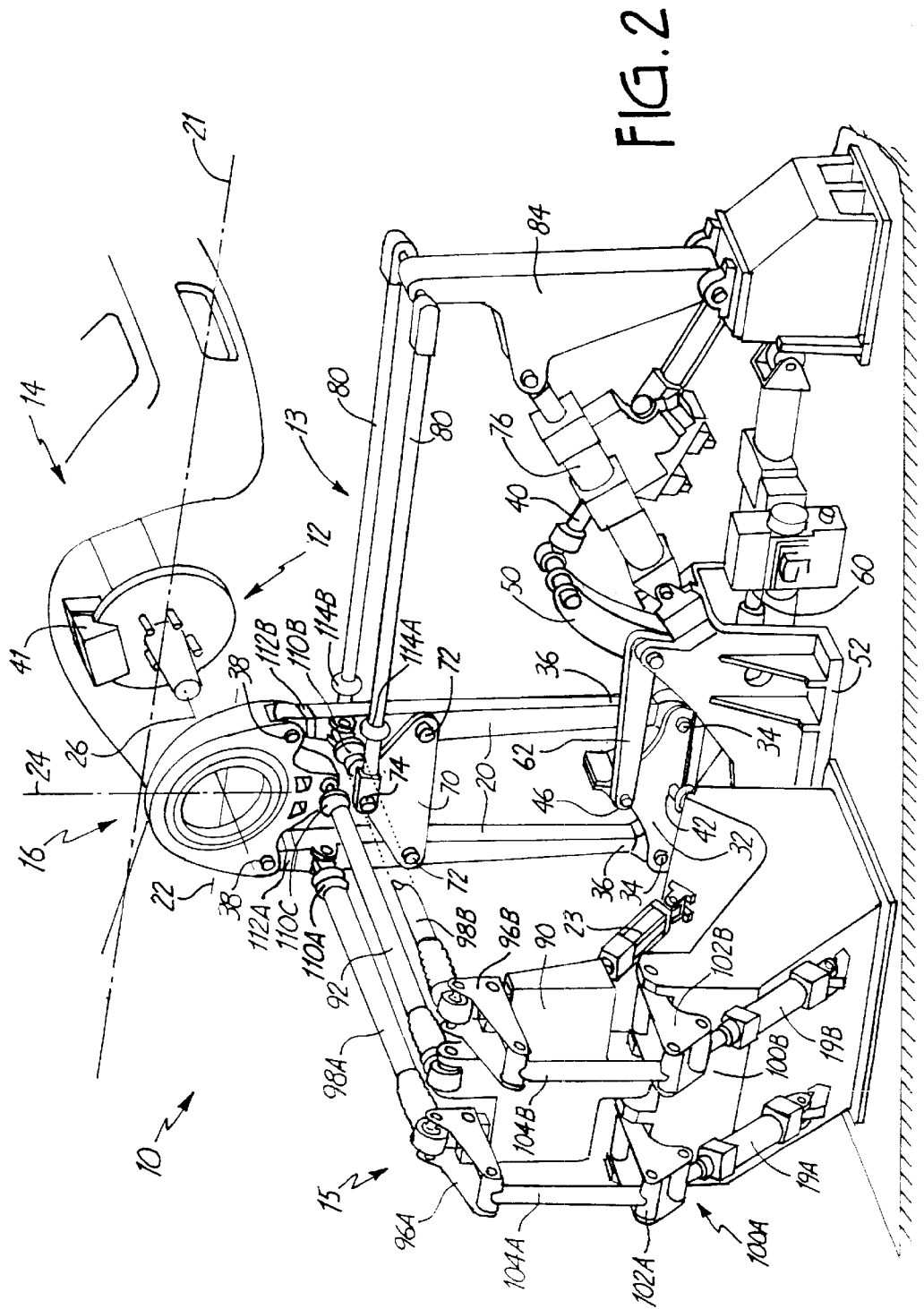
FIG. 2 is a perspective view of the vehicle spindle test fixture including the loading assemblies of the present invention.

Referring to FIG. 1 and the schematic representation thereof, a vehicle spindle test fixture is indicated generally at 10 and is designed for applying linear force and rotational moments to a spindle 12 of a vehicle 14, illustrated in FIG. 2. The vehicle spindle test fixture 10 includes a wheel adapter housing 16 that is fixed to the vehicle spindle 12 in a conventional manner. A first loading assembly 13 includes the wheel adapter housing 16 and a pair of vertically extending loading links or struts 20. Generally, the first loading assembly 13 applies loads to the spindle 12, in directions along one or both of two mutually perpendicular axes 22 and 24. In addition, the first loading assembly 13 can apply a moment or torque about an axis 26 that is mutually perpendicular to axes 22 and 24.

In the exemplary embodiment, the test fixture 10 also includes a second loading assembly 15. The second loading assembly 15 comprises a plurality, of struts 17 and at least one of actuators 19A, 19B and 23. Generally, the second loading assembly 15 can apply a force substantially along the axis 26 as well as a moment about axis 24 and a moment about an axis parallel to the axis 22. Although in the exemplary embodiment, the test fixture 10 includes the first loading assembly 13 and the second loading assembly 15, each of the loading assemblies 13 and 15 comprise separate aspects of the present invention wherein use of one loading assembly does not require use of the other loading assembly.

As used herein, the following definitions for forces and moments about the axes 22, 24 and 26 will apply: a "longitudinal force" is force applied to the wheel adapter housing 16 generally parallel to the axis 22, the axis 22 being parallel to a longitudinal axis 21 of the vehicle 14 (FIG. 2); a "vertical force" is a force to the wheel adapter housing 16 generally along the axis 24; a "lateral force" is a force applied to the wheel adapter housing 16 generally parallel to the axis 26, which is parallel to the axis 26 of the spindle 12 (FIG. 2); a "braking moment" is a moment applied to the vehicle adapter housing 16 generally about the axis 26; a "steer moment" is a moment applied to the vehicle adapter housing 16 generally about the axis 24; and a "camber moment" is a moment applied to the vehicle adapter housing 16 generally about the axis 22 or about an axis that is parallel to the axis 22.

In a first broad aspect of the present invention, the loading assembly 13 further includes a bell crank 32 that is coupled to each of the vertical struts 20 at pivot connections 34 on ends 36 of the vehicle struts 20 remote from the wheel adapter housing 16. It should be noted that the vehicle struts 20 are joined to the wheel adapter housing with pivot connections 38 so as to allow relative motion between the vehicle struts 20 and the wheel adapter housing 16. The pivot connections 34 and 38 can be spherical pivot connections or conventional single axis pivot connections. Other forms of pivot connections can also be used. Connection of the bell crank 32 to the vertical struts 20 allows anti-parallel displacement of the vertical struts 20 parallel to the vertical axis 24. In this embodiment, an actuator 40 is pivotally coupled to the bell crank 32 at a pivot connection 42 located between the vertical struts 20. Typically, the actuator 40 (like all of the actuators discussed below) is a dual-acting hydraulic, pneumatic or electromagnetic actuator.

The actuator 40 is coupled to the bell crank so as to rotate the bell crank and cause anti-parallel displacement of the vertical struts 20 in order to rotate the wheel adapter housing 16 about the axis 26 or spindle axis. Typically, a braking moment is go induced when the brakes 41 (FIG. 2) are applied to hold the spindle 12. The wheel adapter housing 16, vertical struts 20 and bell crank 32 form a parallelogram linkage.

A vertical force can be induced through vertical displacement of the bell crank 32. In the embodiment illustrated, an actuator 60 is coupled to a bell crank or lever 62 that in turn is pivotally coupled to the bell crank 32. The bell crank 62 is supported for pivotal motion on a support member 52. As appreciated by those skilled in the art, the actuator 60 can be directly connected to the bell crank 32 at a pivot connection 46 or through other connecting elements.

Generally, the locations of the pivot connections 34 relative to the pivot connection 46 approximates the locations of the pivot connections 38 relative to the spindle axis 26. In the embodiment illustrated, the spindle axis 26 and pivot connections 38 define a first isosceles triangle (with pivot connections 38 being below spindle axis 26), while the pivot connection 46 and pivot connections 34 define a second isosceles triangle (with pivot connections 34 being below pivot connection 46) that approximates the first isosceles triangle. The parallelogram linkage formed by anti-parallel displacement of the vertical struts 20 decouples or minimizes cross-talk between brake motion and vertical and longitudinal motion.

In one specific embodiment, an offset 30 from a line 38A defined by the pivot connections 38 to the spindle axis 26 is approximately equal to an offset 44 from a line 34A defined by the pivot connections 34 to the pivot connection 46. The offset 30 is greater than a diameter of a pivot shaft of pivot connection 46. Also, the offset 30 is greater than an offset from line 34A to pivot connection 42. In yet a further embodiment, the offsets 30 and 44 approximate a "tire contact patch". As is well known to those skilled in the art, the "tire contact patch" is the portion of the tire contacting the road or other surface when the vehicle travels thereon. The distance to the tire contact patch generally comprises a radius from the spindle axis 26 that includes a portion of the spindle 12, and a wheel and tire assembly (not shown), wherein the tire is generally deformed due to the weight of the vehicle 14.

Although the actuator 40 can be directly coupled to the bell crank 32, in the embodiment illustrated, the actuator 40 is pivotally coupled to a bell crank 50, which in turn, is coupled to the bell crank 32 through struts 51. If desired, a single strut 51 can be used. In this embodiment, the pivot axis of the bell crank 62 coincides with the pivot axis of the bell crank 50.

In another embodiment, the loading assembly 13 can include a bell crank 70 that is coupled to each of the vertical struts 20 at pivot connections 72 disposed between the wheel adapter housing 16 and ends 36 of the vehicle struts 20. The bell crank 70 and pivot connections 72 allow anti-parallel displacement of the vertical struts 20 parallel to the vertical axis 24. An actuator 76 is pivotally coupled to the bell crank 70 at a pivot connection 74 located between the vertical struts 20. The location of the pivot connections 72 relative to the pivot connections 74 approximates the locations of the pivot connections 38 relative to the spindle axis 26. In one embodiment, an offset 78 from a line 72A defined by the pivot connections 72 to the pivot connections 74 is equal to the offset 30. It should be noted in the embodiment illustrated, two connecting members or rods 80 are disposed on opposite sides of a plane defined by the vertical struts 20 and connect the bell crank 70 to the actuator 76 although one connecting strut may be sufficient. In this embodiment, a bell crank 84 is used to connect the actuator 76 to the connecting rods 80 although a direct connection can also be used.

The second loading assembly 15, constituting a second aspect of the present invention, applies one or any combination of a lateral force, a steer moment and a camber moment to the vehicle spindle 12. In addition to the wheel adapter housing 16, the loading assembly 15 includes a bell crank 90 and a connecting strut or member 92 pivotally connected to the bell crank 90 and operably connected to the wheel adapter housing 16 to selectively displace the wheel adapter housing 16. In the embodiment illustrated, the connecting strut 92 is joined to the wheel adapter housing 16 on a downwardly extending tang 77. The actuator 21 is operably connected to the bell crank 90.

A pair of bell cranks 96A and 96B are each pivotally connected to the first bell crank 90 at a pivot pin connection carried by the first bell crank 90 to displace bell cranks 96A and 96B with the first bell crank 90. Each bell crank 96A and 96B is operably connected to the wheel adapter housing 16 using a connecting strut 98A and 98B, respectively, to selectively displace the wheel adapter housing 16. In the embodiment illustrated in FIGS. 1 and 2, the struts 98A and 98B are joined to the vertical struts 20 with bearings (e.g. horizontally oriented trunnion joint) 99A and 99B provided on ends thereof and powered by actuators 19A and 19B. The struts 98A and 98B and bearings 99A and 99B are similar in construction and operation to similar components in the test fixture described in U.S. patent application Ser. No. 09/304, 910, filed on May 4, 1999, entitled "Loading Assembly for a Vehicle Spindle Test Fixture", which is hereby incorporated by reference in its entirety.

Figure 3:
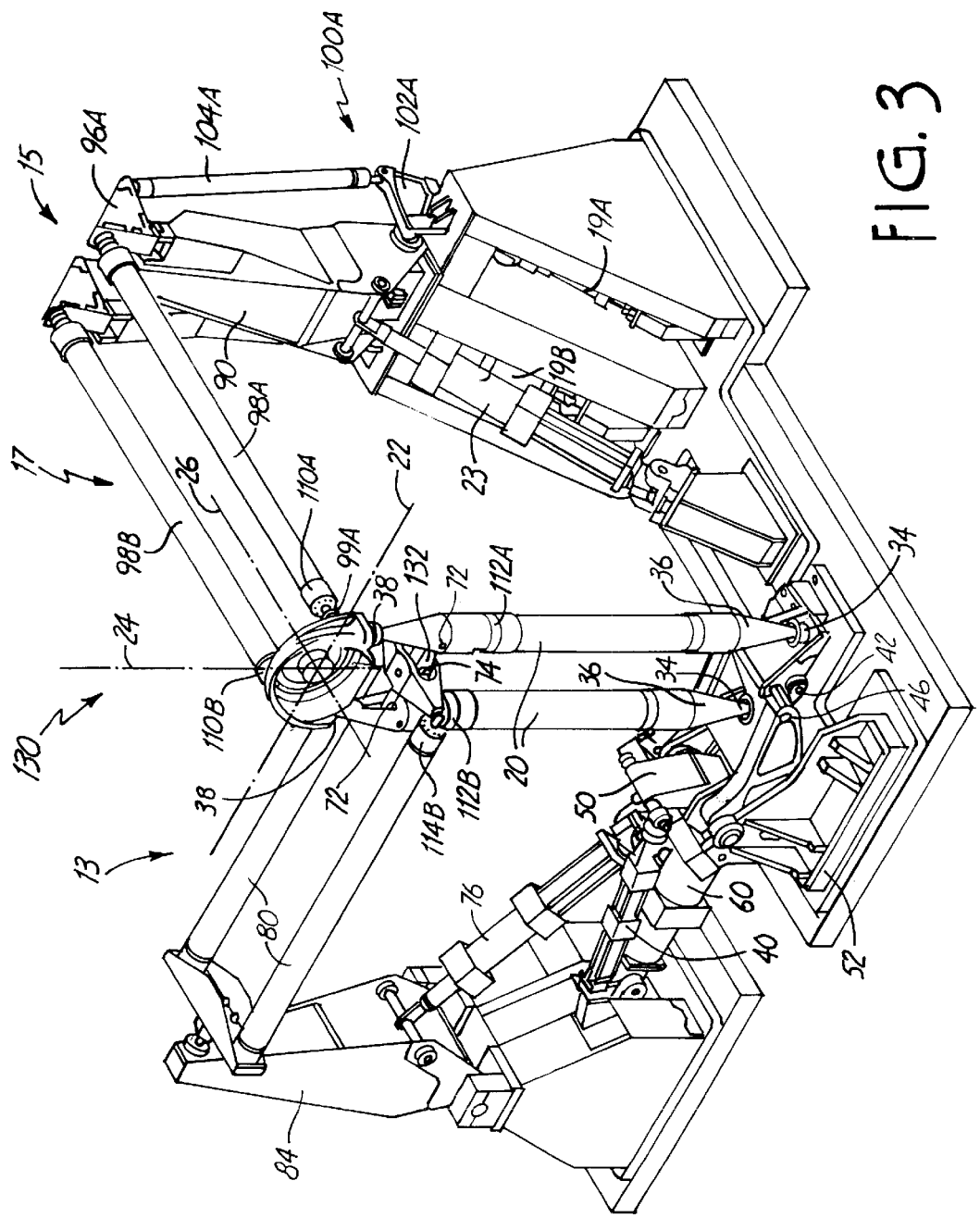
FIG. 3 is a perspective view of a second embodiment of a vehicle spindle test fixture.
Figure 4:
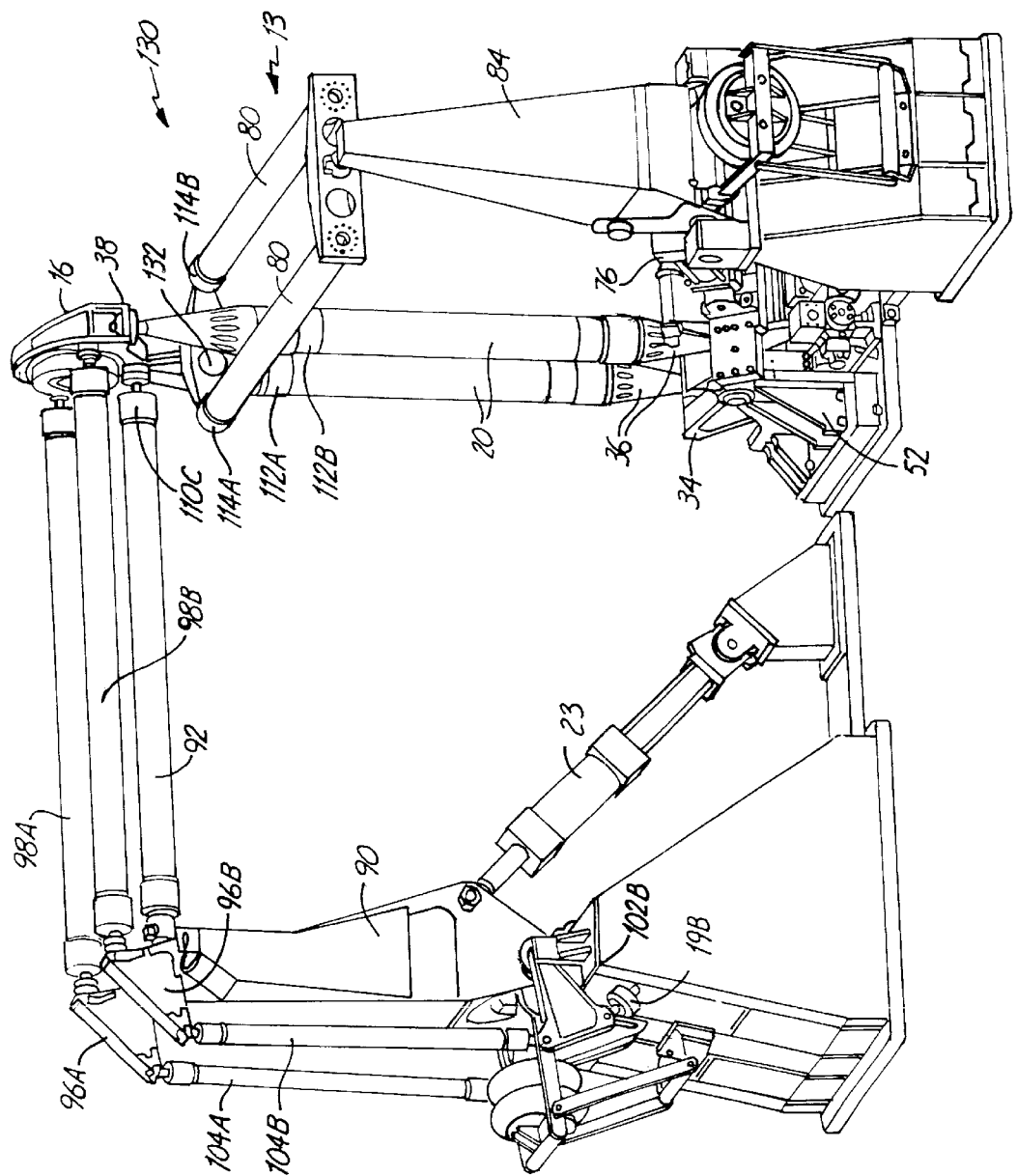
FIG. 4 is another perspective view of the second embodiment of a vehicle spindle test fixture.

In another embodiment as illustrated in FIGS. 3 and 4, the struts 98A and 98B can be directly connected to the wheel adapter housing 16. Simultaneous actuation of the actuators 21; 19A and 19B displaces the wheel adapter housing 16 substantially along the spindle axis 26. A steer moment can be applied on the spindle 12 when the actuators 19A and 19B are differentially operated so as to cause anti-parallel displacement of the connecting rods 98A and 98B. A camber moment about axis 22 is applied when the actuator 76 is generally held fixed and the actuators 19A and 19B are operated. It should be noted that in an alternative embodiment, when a steer moment need not be induced or applied to the vehicle spindle 12, the bell cranks 96A and 96B can be joined together and operated by a single actuator.

Although the actuators 19A and 19B can be directly connected to the bell cranks 96A and 96B, in one embodiment, as illustrated, parallelogram linkage assemblies 100A and 100B are provided. The parallelogram linkage assembly 100A includes the bell crank 96A, the bell crank 102A and a connecting member 104A. The actuator 19A is operably connected to the parallelogram linkage assembly 100A, for example, as illustrated wherein the actuator 19A is pivotally connected to the bell crank 102A. The parallelogram linkage assembly 100B is similarly constructed using the bell crank 96B, the bell crank 102B and a connecting member 104B. The parallelogram linkage assemblies 100A and 100B decouple or minimize cross-talk between lateral translation and camber moment.

FIGS. 3 and 4 illustrate a second embodiment of a vehicle spindle test fixture 130. Many of the components of the vehicle spindle test fixture 10 are present and are similarly numbered. However, in this embodiment, a longitudinal force is applied to the vertical struts 20 with a connecting member 132 that does not have the offset 78 as found in the connecting member 70. In addition, the camber moment is applied about an axis that is parallel to the axis 22 due to the arrangement of the struts 17.

Load cells 110A, 110B and 110C are provided in the struts 98A, 98B and 92 to measure loads transmitted therethrough and provide representative electric signals to a controller, not shown, in order to calculate the lateral force, the steer moment and the camber moment on the vehicle spindle 12. Similarly, load cells 112A, 112B and 114A and 114B are provided in the struts 20, and the struts 80 to measure loads transmitted therethrough in order to calculate the vertical force, the braking moment and the longitudinal force applied to the vehicle spindle 12. A wheel force transducer, such as described in U.S. patent application Ser. No. 08/892,914, can be mounted to the wheel adapter housing 16 and the spindle 12. The wheel force transducer measures loads for each axis in the vehicle suspension. Alternatively, the vehicle suspension can be instrumented directly as is well-known in the art.

Although the present invention has been described with reference to preferred embodiments, workers skilled in the art will recognize that changes may be made in form and detail without departing from the spirit and scope of the invention.

What is claimed is:

1. A loading assembly used in a vehicle spindle test fixture to apply selected loads to a vehicle spindle with respect to at least one of a spindle axis of the vehicle spindle, a longitudinal axis that is substantially perpendicular to a spindle axis of the vehicle spindle and a vertical axis that is substantially perpendicular to the spindle axis and substantially perpendicular to the longitudinal axis of the vehicle, the loading assembly comprising:

a wheel adapter housing mountable to the vehicle spindle in a fixed position relative to the spindle axis;

a pair of vertical struts, each strut being pivotally joined to the wheel adapter housing at a first pivot connection;

a bell crank pivotally coupled to the vertical struts, wherein each vertical strut forms a second pivot connection with the bell crank;

a first actuator pivotally joined to the bell crank at a third pivot connection to displace the bell crank, the vertical struts and the wheel adapter housing substantially along the vertical axis;

a second actuator operably coupled to the bell crank at a fourth pivot connection to rotate the bell crank and cause anti-parallel displacement of the vertical struts; and wherein the wheel adapter housing, vertical struts and bell crank form a parallelogram linkage, and wherein a first offset distance from a line between the first pivot connections to the spindle axis is equal to a second offset distance from a line between the second pivot connections to the third pivot connection and greater than a distance from the line between the second pivot connections and the fourth pivot connection.

2. The loading assembly of claim 1 and further comprising:

a second bell crank pivotally coupled to the vertical struts remote from the wheel adapter housing; and a third actuator operably coupled to the second bell crank.

3. The loading assembly of claim 2 wherein the second bell crank is coupled to each of the vertical struts at fifth pivot connections disposed between the wheel adapter housing and ends of the vertical struts remote from the wheel adapter housing to allow anti-parallel displacement of the vertical struts along the vertical axis; and wherein the third actuator is operably coupled to the second bell crank at a sixth pivot connection located between the vertical struts and at a third offset distance from a line between the fifth pivot connections equal to the first offset distance, the third actuator adapted to displace the wheel adapter housing substantially along the longitudinal axis.

4. The loading assembly of claim 3 wherein the spindle axis, the third pivot connection and the sixth pivot connection are aligned vertically and centered between axes of the vertical struts.

5. The loading assembly of claim 1 and further comprising:

a support member; and a second bell crank pivotally coupled to the first-mentioned bell crank, pivotally coupled to the second actuator, and pivotally coupled to the support member.

6. The loading assembly of claim 5 and further comprising means for selectively displacing the wheel adapter housing substantially along the spindle axis, substantially about the vertical axis and substantially about an axis parallel to the longitudinal axis.

7. A loading assembly used in a vehicle spindle test fixture to apply selected loads to a vehicle spindle with respect to at least one of a spindle axis of the vehicle spindle, a longitudinal axis that is substantially perpendicular to a spindle axis of the vehicle spindle and a vertical axis that is substantially perpendicular to the spindle axis and substantially perpendicular to the longitudinal axis of the vehicle, the loading assembly comprising:

a wheel adapter housing mountable to the vehicle spindle;

a pair of vertical struts, each vertical strut being joined to the wheel adapter housing at spaced-apart first pivot connections;

a bell crank coupled to the vertical struts, wherein each vertical strut forms a second pivot connection with the bell crank;

an actuator pivotally coupled to the bell crank at a third pivot connection having a pivot shaft, the pivot shaft further having a diameter; and wherein a distance from a line between the second pivot connections to the third pivot connection approximates a distance from a line between the first pivot connections to the spindle axis, the distances being greater than the diameter of the pivot shaft, and wherein the second pivot connections are below the third pivot connection and the first pivot connections are below the spindle axis.

8. The loading assembly of claim 7 wherein a first isosceles triangle defined by the first pivot connections and the spindle axis approximates a second isosceles triangle defined by the second pivot connections and the third pivot connection.

9. The loading assembly of claim 8 and further comprising:
a second bell crank pivotally coupled to the vertical struts remote from the wheel adapter housing; and
a second actuator operably coupled to the second bell crank to displace the wheel adapter housing substantially along the longitudinal axis.

10. The loading assembly of claim 9 wherein the second bell crank is coupled to each of the vertical struts at fourth pivot connections disposed between the wheel adapter housing and ends of the vertical struts remote from the wheel adapter housing to allow anti-parallel displacement of the vertical struts along the vertical axis; and wherein the second actuator is operably coupled to the second bell crank at a fifth pivot connection located between the vertical struts.

11. The loading assembly of claim 10 wherein a third isosceles triangle defined by the fourth pivot connections and the fifth pivot connection approximates the first isosceles triangle.

12. A loading assembly used in a vehicle spindle test fixture to apply selected loads to a vehicle spindle with respect to at least one of a spindle axis of the vehicle spindle, a longitudinal axis that is substantially perpendicular to a spindle axis of the vehicle spindle and a vertical axis that is substantially perpendicular to the spindle axis and substantially perpendicular to the longitudinal axis of the vehicle, the loading assembly comprising:
a wheel adapter housing mountable to the vehicle spindle;
a first bell crank;
a connecting strut pivotally connected to the wheel adapter housing and the first bell crank;
a first actuator operably connected to the first bell crank to displace the wheel adapter housing substantially parallel to the spindle axis;
a pair of second bell cranks, each second bell crank being pivotally connected to the first bell crank at a pivot pin connection carried by the first bell crank;
a pair of second connecting struts, each second connecting strut pivotally connected to one of the second bell cranks and operably coupled to the wheel adapter housing such that anti-parallel displacement of the second connecting struts causes the wheel adapter housing to rotate; and
at least one second actuator operably connected to the second bell cranks.

13. The loading assembly of claim 12 and further comprising two second actuators, each second actuator being separately and operably connected to one of the second bell cranks.

14. The loading assembly of claim 12 and further comprising a pair of parallelogram linkage assemblies, each parallelogram linkage assembly comprising the first bell crank, one of the second bell cranks, a third bell crank pivotal on a pivot axis of the first bell crank, and a connecting member pivotally connected to said one of the second bell cranks and the third bell crank, wherein the corresponding second actuator is operably connected to the parallelogram linkage assembly.

15. The loading assembly of claim 14 wherein the corresponding second actuator of each parallelogram linkage assembly is operably connected to the corresponding third bell crank.

16. In combination, a vehicle having a known distance from a spindle axis to a tire contact patch wherein a tire contacts a road surface during operation of the vehicle and a loading assembly used in a vehicle spindle test fixture to apply selected loads to a vehicle spindle of the vehicle with respect to at least one of the spindle axis of the vehicle spindle, a longitudinal axis that is substantially perpendicular to a spindle axis of the vehicle spindle and a vertical axis that is substantially perpendicular to the spindle axis and substantially perpendicular to the longitudinal axis of the vehicle, the loading assembly comprising:
a wheel adapter housing mountable to the vehicle spindle in a fixed position relative to the spindle axis;
a pair of vertical struts, each strut being pivotally joined to the wheel adapter housing at a first pivot connection;
a bell crank pivotally coupled to each end of the vertical struts at a second pivot connection;
an actuator pivotally joined to the bell crank at a third pivot connection to displace the bell crank, the vertical struts and the wheel adapter housing substantially along the vertical axis; and
wherein the wheel adapter housing, vertical struts and bell crank form a parallelogram linkage, and wherein a first offset from a line between the first pivot connections to the spindle axis is equal to a second offset from a line between the second pivot connections to the third pivot connection, wherein the first offset and the second offset each approximate a tire contact patch of the tire and wheel assembly mounted to a spindle of the vehicle.

17. The combination of claim 16 and further comprising:
a second bell crank pivotally coupled to the vertical struts remote from the wheel adapter housing; and
a second actuator operably coupled to the second bell crank.

18. The combination of claim 17 wherein the second bell crank is coupled to each of the vertical struts at fourth pivot connections disposed between the wheel adapter housing and ends of the vertical struts remote from the wheel adapter housing to allow anti-parallel displacement of the vertical struts along the vertical axis; and wherein the second actuator is operably coupled to the second bell crank at a fifth pivot connection located between the vertical struts and at a third offset from a line between the fourth pivot connections equal to the first offset, the second actuator adapted to displace the wheel adapter housing substantially along the longitudinal axis.

19. The combination of claim 18 wherein the spindle axis, the third pivot connection and the fifth pivot connections are aligned vertically and centered between axes of the vertical struts.

* * * * *